Oct. 24, 1967  V. H. AMES ETAL  3,348,498
RAILWAY CAR POSITIONING MECHANISM
Filed July 6, 1965  4 Sheets-Sheet 1
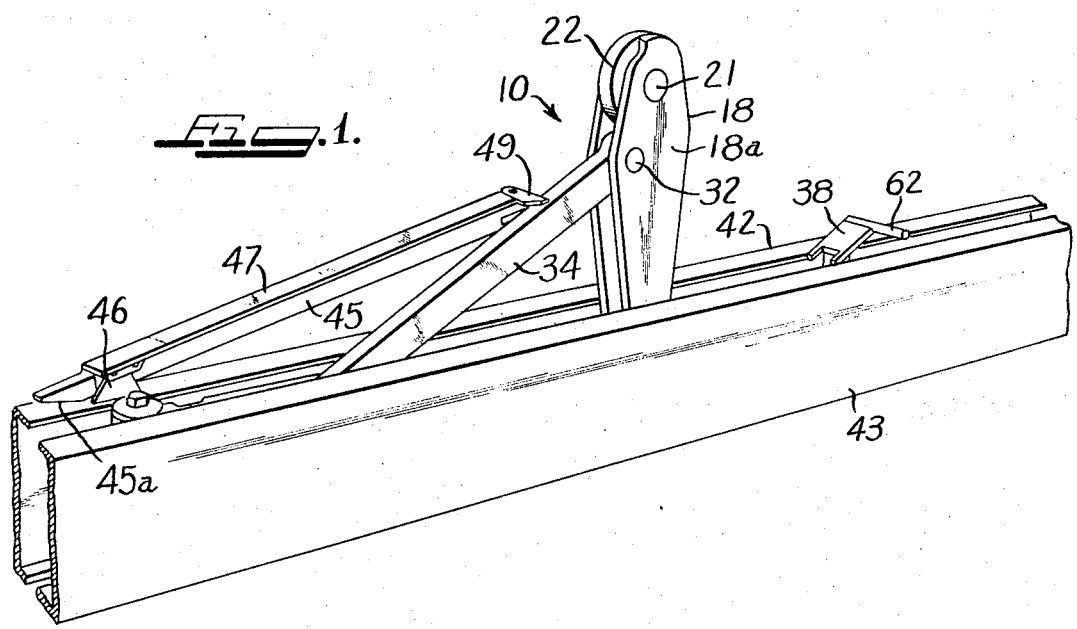
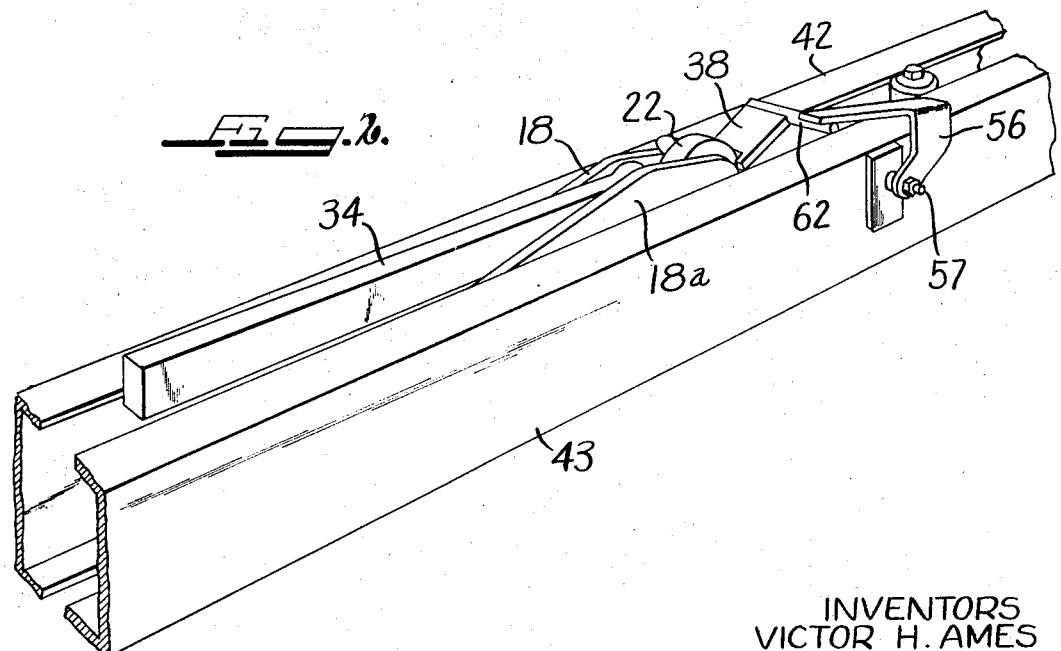
INVENTORS
VICTOR H. AMES
EDWARD T. DOLIN
BY
Greist, Lockwood, Greenawalt & Dewey
Attys.

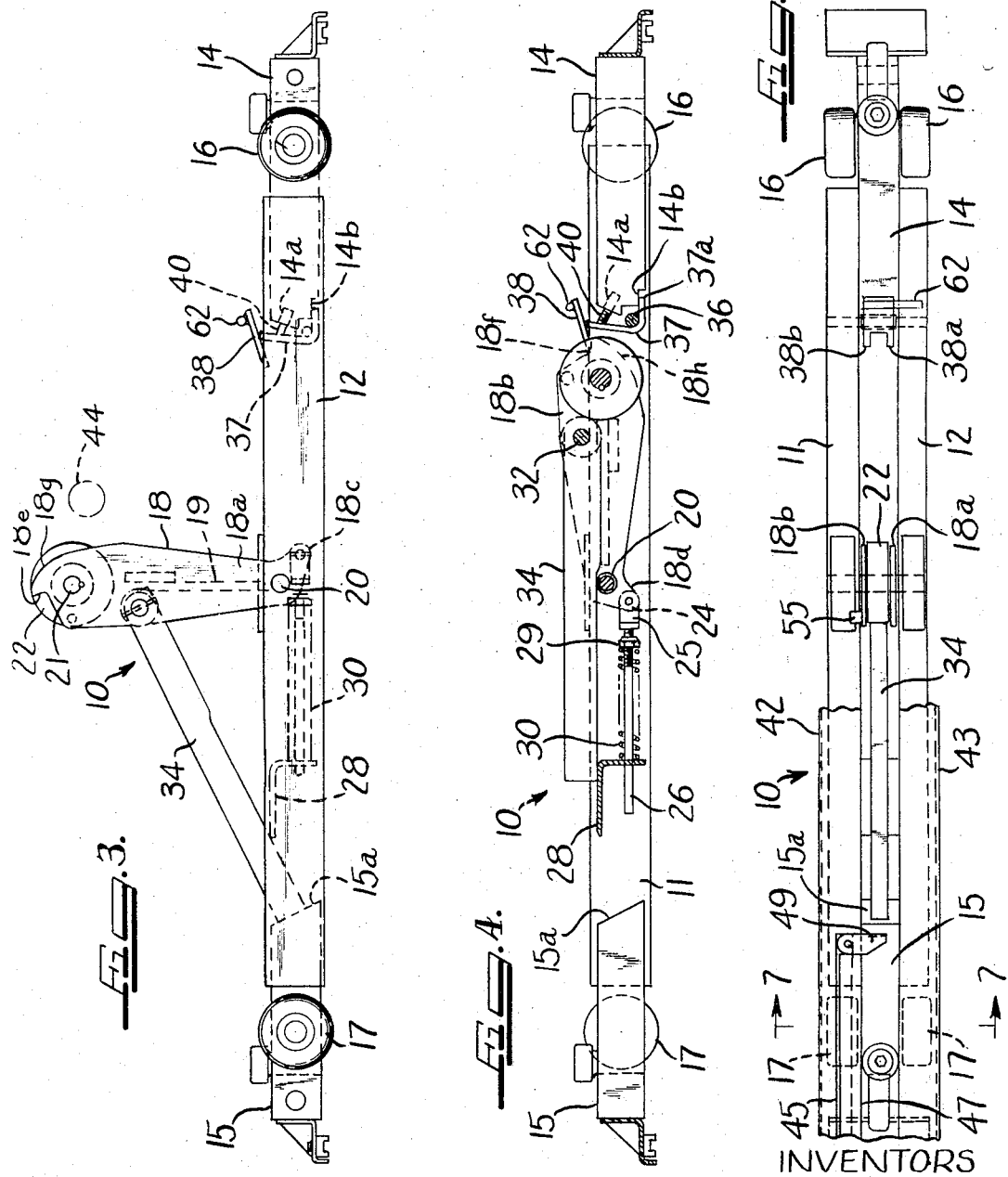

Oct. 24, 1967     V. H. AMES ETAL     3,348,498
RAILWAY CAR POSITIONING MECHANISM
Filed July 6, 1965     4 Sheets-Sheet 3
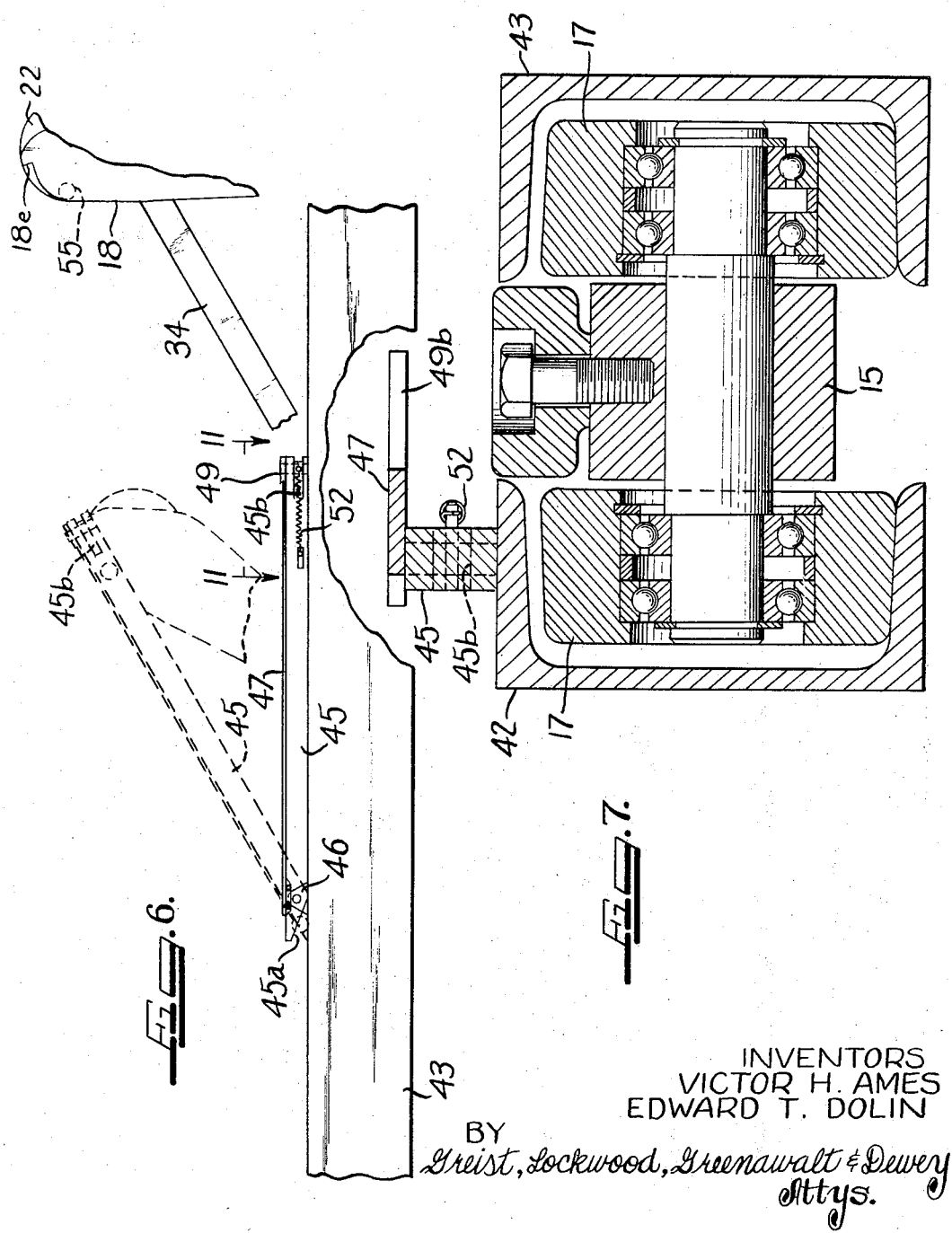
INVENTORS
VICTOR H. AMES
EDWARD T. DOLIN
BY
*Greist, Lockwood, Greenawalt & Dewey*
*Attys.*

Oct. 24, 1967    V. H. AMES ETAL    3,348,498
RAILWAY CAR POSITIONING MECHANISM
Filed July 6, 1965    4 Sheets-Sheet 4
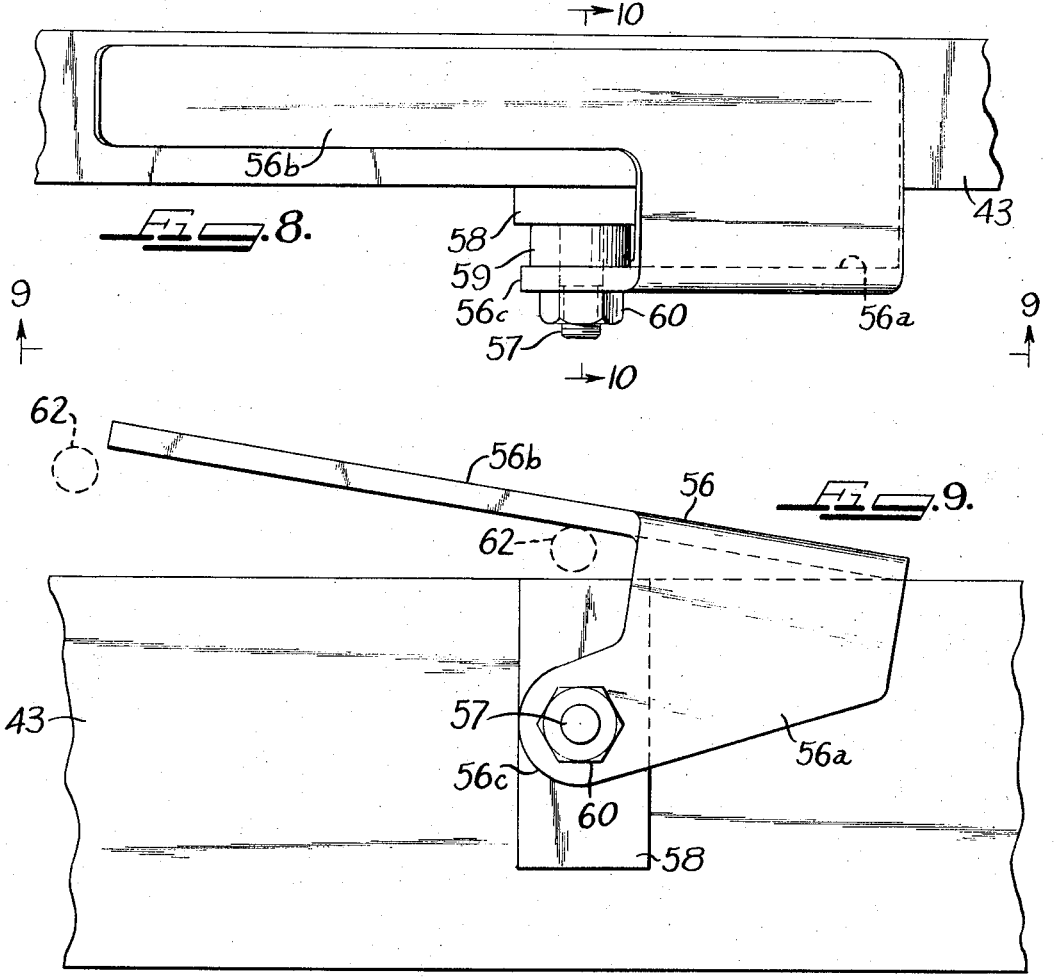
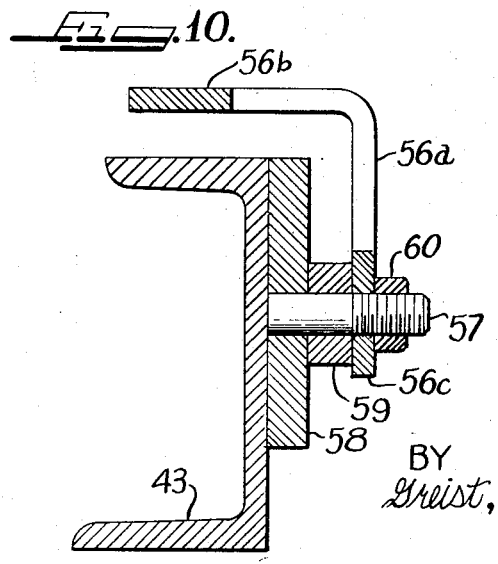
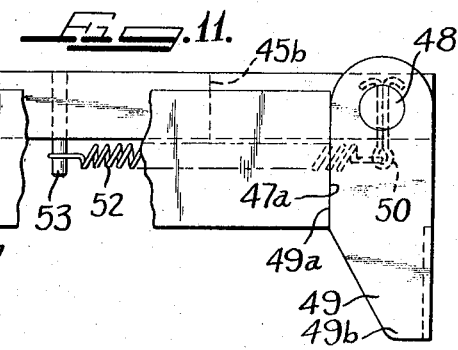
INVENTORS
VICTOR H. AMES
EDWARD T. DOLIN
BY
Greist, Lockwood, Greenawalt & Dewey
Attys.

United States Patent Office 3,348,498
Patented Oct. 24, 1967

3,348,498
RAILWAY CAR POSITIONING MECHANISM
Victor H. Ames, Midlothian, and Edward T. Dolin, Oaklawn, Ill., assignors to Whiting Corporation, a corporation of Illinois
Filed July 6, 1965, Ser. No. 469,696
6 Claims. (Cl. 104—176)

This invention relates to mechanism for moving and positioning railway cars along a section of track, and more particularly to new and improved means for automatically collapsing and erecting a railway car pushing device referred to in the art as a robot.

It is a primary object of the present invention to provide in association with a collapsible robot of the type adapted for pushing engagement with a railway car axle when the former is moved in one direction and adapted for deflecting under the railway car axle when the robot is moved in the other direction, new and improved means for automatically collapsing the robot when the same is moved in said other direction.

Another object of the present invention is to provide in association with a robot of the type described, means for automatically erecting the robot when the same is moved in one direction and other means for automatically collapsing the robot when the same is moved in the other direction.

Still another object of the present invention is to provide a railway car positioning apparatus comprising, in combination, a robot including powered means for moving the robot in either direction along a section of railway track, means for automatically erecting the robot when the same is moved in one direction, and other means for automatically collapsing the robot when the same is moved in the other direction.

These and other objects and advantages of the invention will become apparent from the following specification disclosing a preferred embodiment of the invention which is illustrated in the accompanying drawings wherein:

FIG. 1 is a perspective view of the mechanism of the present invention showing the robot in its erected position;

FIG. 2 is a perspective view similar to FIG. 1, but showing the robot in its collapsed position;

FIG. 3 is a side elevational view of the robot showing the same in its erected position;

FIG. 4 is a side elevational view of the robot showing the same in its collapsed position;

FIG. 5 is a fragmentary top plan view of the robot and the collapsing mechanism therefor;

FIG. 6 is a side elevational view primarily illustrating the robot collapsing mechanism with the same being shown in full lines in its horizontal position and being shown in broken lines in its inclined position;

FIG. 7 is an enlarged section taken along line 7—7 of FIG. 5;

FIG. 8 is an enlarged top plan view of the mechanism for erecting the robot;

FIG. 9 is a view taken along line 9—9 of FIG. 8;

FIG. 10 is a section taken along line 10—10 of FIG. 8; and

FIG. 11 is an enlarged view taken along line 11—11 of FIG. 6.

Referring now to the drawings, the railway car moving or positioning mechanism, referred to in the art as a robot, is generally designated 10 and is best illustrated in FIGS. 3–5. The robot illustrated herein, which of itself forms no part of the present invention, is substantially the same as the car holding mechanism described in the co-pending application of Wallace J. Saxonmeyer, Ser. No. 346,649, filed Feb. 24, 1964.

The robot includes a base defined by parallel, spaced beams 11 and 12 connected at their respective opposite ends to elongated blocks or bars 14 and 15. Block 14 supports a pair of rollers 16; likewise block 15 supports an identical pair of rollers 17. Block 15 includes an inclined surface 15a which serves as an abutment or stop as will be explained hereinbelow.

The robot includes an arm 18 defined by identical spaced plates 18a and 18b, which plates are secured together for movement in unison by a suitable web plate 19. Plates 18a and 18b have corresponding ends thereof pivotally supported by a pin 20 having its ends mounted in bores formed in respective beams 11 and 12. The other ends of plates 18a and 18b include respective aligned bores mounting opposite ends of a pin 21, which pin rotatably mounts a roller or wheel 22 between the plates defining the arm 18. From FIGS. 3 and 4, it will be noted that plates 18a and 18b include generally right angle extensions 18c and 18d, respectively. These extensions support a cross pin 24 (FIG. 4) pivotally mounting a yoke 25 which is threadingly engaged with one end of rod 26. The other end of rod 26 is slidably received in a suitable aperture in one flange of an angle 28, which angle is secured between beams 11 and 12 defining the base of the robot. A nut 29 is threadingly mounted on rod 26 adjacent the yoke 25. A coil spring 30 encircles a portion of rod 26, which spring has one end thereof in abutting engagement with nut 29 and which spring has the other end thereof abutting the vertical flange of angle 28. Coil spring 30 acts to urge or force arm 18 in a counterclockwise direction as viewed in FIG. 3.

Plates 18a and 18b include respective aligned bores mounting opposite ends of a pin 32; this pin is received in the opening in one end of an arm 34 thereby pivotally mounting the same from arm 18. The free end of arm 34 is adapted for abutting engagement with surface 15a of block 15, thereby to brace arm 18 in its erected or vertical position shown in FIG. 3. Upon collapsing of arm 18, i.e. clockwise movement of the same as viewed in FIGS. 3 and 4, the free end of arm 34 slides on the horizontal flange of angle 28.

Beams 11 and 12 have respective aligned openings pivotally mounting opposite ends of a pin 36. A bent bar 37 is suitably secured to pin 36, as by welding. The upper end of bar 37 mounts a foot plate 38 having integral, spaced extensions 38a and 38b (FIG. 5), which extensions are adapted for engagement with respective projections 18e and 18f on the free end of arm 18 for holding the latter in its horizontal or collapsed position as illustrated in FIG. 4. A small spring 40 has one end thereof housed in a bore 14a in bar 14. The other end of this spring abuts the upper portion of bent bar 37 for urging the same to rotate or swing in a counterclockwise direction (FIGS. 3 and 4) about pin 36. Movement of bar 37 in this direction is limited by engagement of the lower end 37a thereof with an undercut surface 14b of bar 14.

It will be noted that plates 18a and 18b include respective arcuate surfaces 18g and 18h. These last mentioned surfaces strike extensions 38a and 38b upon lowering of arm 18 thereby deflecting plate 38 to the right as viewed in FIGS. 3 and 4, whereby upon continued lowering of arm 18, extensions 38a and 38b snap into place over respective projecting surfaces 18e and 18f thereby to hold arm 18 in its collapsed position. It will be apparent that arm 18 will be released upon clockwise swinging of plates 37 and 38 about supporting pin 36, thereby to cause erection of arms 18, 34 by spring 30. Abutting engagement of the free end of arm 34 with surface 15a limits this upward swinging movement of the arms.

It is believed that the above description of the robot is sufficient for purposes of understanding the present invention. For a more detailed description of the robot, reference may be had to the description of the car holder illustrated in the above mentioned Saxonmeyer application. In the aforesaid Saxonmeyer application, the car holders are movably mounted in side-by-side relation by suitable guide track means, and both car holders are connected with resilient cushioning means which are anchored to the ground. In the Saxonmeyer application, the car holders act, not to position or move railway cars, but rather to hold a number of cars along a section of track, the cushioning means being provided to reduce the shock forces developed upon coupling of the cars held by the car holders.

As noted in FIGS. 1 and 2, robot 10 is mounted for movement by guide track means illustrated in the form of a pair of confronting structural channels 42 and 43. FIG. 7 illustrates the rolling engagement between rollers 17 and the upper surfaces of the lower flanges of the channels. It will be understood of course that rollers 16 are received in the channels in the same manner. The guide track means consisting of channels 42 and 43, which are only fragmentarily illustrated in FIGS. 1 and 2, are suitably mounted between the rails of a section of railway track (not shown). This section of track may be in a freight yard or it may adjoin and extend into a shop or building where railway cars are to be loaded, unloaded, or repaired, for example. Opposite ends of the robot are connected to cables or ends of a single cable, which cable or cables are connected with power means usually in the form of a winch. Operation of the winch of course brings about movement of the robot in either direction along the guide tracks defined by channels 42 and 43.

Assume that channels 42 and 43 are mounted between a section of track which is long enough to accommodate a number of railway cars and which section of track extends to the right (as viewed in FIGS. 1 and 2) into a shop where railway cars are to be repaired. The guide track means defined by channels 42 and 43 are coextensive with this section of track. The winch for operation of the robot is preferably mounted near the end of this section of track which extends into the repair shop. Assume further that a number of railway cars are supported on this section of railway track. When the robot is erected and moved to the right as viewed in the drawings, the robot is adapted for pushing engagement with a railway car by engagement of roller 22 with a railway car axle illustrated in phantom lines in FIG. 3 and designated 44. During this movement of the robot, the arm 18 cannot rotate or collapse by reason of the abutting engagement between the free end of brace arm 34 and surface 15a of bar 15. However, it will be appreciated that when the robot is erected and moved in the other direction, i.e. to the left as viewed in the drawings, upon engagement of roller 22 with the rail car axle, arm 18 will deflect in a clockwise direction about pin 20, thereby permitting the robot to deflect under the rail car axle. As soon as the robot passes beneath the axle, spring 30 acts to erect the robot.

Assume that it is desired to move the robot beneath a number of railway cars before the direction of movement of the robot is reversed for pushing engagement with a particular car. When this is to be done, it is desirable to have the robot collapsed thereby to prevent the same from banging or striking the axles of the cars as the robot passes beneath the same. It is also desirable to erect the robot automatically to ready the same for pushing engagement with a railway car axle. The present invention primarily has to do with means for automatically collapsing the robot when the same is to be pulled under a number of railway cars and for automatically erecting the robot when the same is to be brought into pushing engagement with a railway car.

The robot collapsing mechanism is illustrated in FIGS. 1, 5–7 and 11. This mechanism will be seen to include a bar 45 having one end thereof pivotally supported between a pair of ear plates 46, which plates are secured to the upper surface of the upper flange of channel 42 at an appropriate location therealong as will be explained below. Bar 45 includes a bevelled end defined by a surface 45a inclined with respect to the bar. Surface 45a is adapted for abutting engagement with the upper surface of the upper flange of channel 42 thereby serving as a stop for limiting upward swinging movement of bar 45 in a counterclockwise direction as viewed in FIG. 6. The uppermost inclined position of bar 45 is shown in broken lines in FIG. 6. It will be noted that bar 45 is adapted to rest in a horizontal position on the upper surface of the top flange of channel 42.

An elongated plate 47 is secured to the upper surface of bar 45 (FIG. 7) and extends in overhanging relation with the latter inwardly of the guide tracks defined by channels 42 and 43. Plate 47 extends for substantially the entire length of bar 45; as noted in FIGS. 1 and 11, opposite ends of plate 47 terminate short of the associated opposite ends of bar 45.

The free end of bar 45 includes a slot 45b. This end of the bar includes aligned openings rotatably mounting opposite ends of a pin 48. The upper end of this pin supports a catch plate 49 and thereby mounts the same for pivoting movement about an axis defined by the central axis of pin 48. Pin 48 includes a diametrically disposed through bore which is arranged along the pin so as to be received within slot 45b of the bar. This diametrically arranged bore mounts a cotter pin 50 (FIG. 11) the bight portion of which is engaged by one end of a spring 52. The other end of spring 52 is connected to one end of a pin 53; this pin is suitably mounted from bar 45. Spring 52 urges pin 48 in a clockwise direction as viewed in FIG. 11, and thereby urges catch plate 49 in the same direction for yieldably holding planar edge 49a into abutting engagement with end surface 47a of plate 47. It will be apparent that the spring permits catch plate 48 to be deflected or rotated in a counterclockwise direction as viewed in FIG. 11. During this counterclockwise rotation of plate 49, the end of spring 52 connected with cotter pin 50 enters the slot 45b in bar 45. As best seen in FIGS. 1 and 11, catch plate 49 has an extension 49b which extends inwardly of the guide tracks well beyond the overhanging portion of plate 47.

At this time it should be mentioned that plate 18b of arm 18 mounts a cylindrical stud or roller 55 on the outer surface thereof adjacent the free end of arm 18. As will be explained below, stud 55 is adapted to be received in the guideway defined by the undersurface of the overhanging portion of plate 47 and the adjacent surface of bar 45 thereby to cause collapsing of the robot.

The mechanism for erecting the robot is illustrated in FIGS. 2 and 8–10. This mechanism includes a bent plate 56 having a vertically disposed portion 56a and a generally horizontally disposed portion 56b. Plate 56a has a rounded extension 56c provided with a bore rotatably engaging one end of a pin 57. This pin has the other end thereof suitably mounted in a bore formed in a plate 58, which plate is secured to the outside surface of channel 43. A collar or spacer 59 is mounted on pin 57 between plate 58 and portion 56c of plate 56. The outer end of pin 57 is threaded and threadingly receives a nut 60 which serves to secure plate 56 on pin 57.

It will be understood that by reason of the arrangement or shape of plate 56 with respect to its pivot axis defined by pin 57, gravity acts to position plate 56 as illustrated in FIG. 9 wherein the undersurface of one end of plate portion 56b rests on the upper surface of the top flanged channel 43. It will be observed from FIGS. 1, 8 and 10 that plate portion 56b is elongated in a direction parallel with channel 43 and generally extends over the upper surface of a portion of the top flange of the channel.

As seen in FIGS. 2 and 5, a pin 62 has one end thereof secured, as by welding for example, to foot plate 38. As noted in FIG. 4, this pin is arranged with respect to pin 36 so that when the former is urged generally downwardly it will act to rotate or swing plates 37 and 38 in a clockwise direction about pin 36 thereby to disengage extensions 38a and 38b from respective projecting surfaces 18e and 18f (if arm 18 is being held in collapsed position by foot plate 38).

The operation of the mechanism of the instant invention is as follows:

Assume that the robot collapsing mechanism is mounted on channel 42 at a location therealong which is adjacent the end of the section of track extending into the repair shop, for example. Assume further that the robot erecting mechanism is mounted on channel 43 at a location therealong which is adjacent the other end of the track section, i.e. the end which is remote from the railway car repair shop or building.

Also assume that the robot is erected and is at a location along channels 42 and 43 to the right of the collapsing mechanism. Now when the robot is moved from right to left, inclined brace arm 34 of the robot will strike extension 49b of catch plate 49. The catch plate will not be free to rotate relative to bar 45 by reason of the abutting engagement between surfaces 49a and 47a. Therefore, continued movement of the robot from right to left causes catch plate extension 49b to ride up the upper surface of arm 34 thereby to cause upward swinging movement of bar 45 and of course plate 47 secured thereto. This upward swinging movement of bar 45 is stopped as soon as surface 45a of the bar abuts the upper surface of the top flange of channel 42. As movement of the robot continues from right to left, the advancing surface of plate 18b of arm 18 comes into engagement with portion 49b of the catch plate, which catch plate is no longer free to swing or move as explained above. Therefore, continued movement of the robot causes arms 18 and 34 of the robot to commence collapsing. After these arms have started their initial collapsing movement, stud 55 is received beneath the overhanging portion of plate 47. Accordingly, as the robot continues its movement from right to left, stud 55 is cammed downwardly by plate 47 thereby to cause collapsing of arms 18 and 34. Just as stud 55 reaches the lower end of plate 47, i.e. the end adjacent the pivotally mounted end of bar 45, projecting surfaces 18e and 18f of the arm snap beneath respective extensions 38a and 38b of plate 38 whereupon arms 18 and 34 are held in collapsed position. Therefore, the arms do not erect themselves after member 55 passes from beneath the overhanging portion of plate 47. It will be apparent that bar 45 and the members supported thereby will automatically be lowered after passage of stud 55 from beneath plate 47, whereupon arm 45 and the components associated therewith will come to rest in the position illustrated in solid lines in FIG. 6.

After the robot has been collapsed as just described, the same is moved beneath a number of railway car axles. The location of the robot erecting mechanism will of course determine the distance the robot moves before being erected. As the robot approaches the erecting mechanism from right to left, the overhanging portion of pin 62 comes into engagement with the upper surface of plate portion 56b near the upper end of the latter. As this portion of pin 62 contacts plate portion 56b, the pin merely rides over the upper surface of plate portion 56b and in so doing rocks plate 56 about pin 57, whereupon after passage of pin 62 gravity acts to return plate 56 to the position illustrated in FIG. 9. It will be understood that pin 62 is not moved upwardly during this movement over plate portion 56b.

After the robot is moved a short distance beyond the erecting mechanism, the direction of movement of the robot is reversed. Now as the robot approaches the erecting mechanism, the overhanging portion of pin 62 comes into engagement with the undersurface of plate 56b as illustrated in FIG. 9. As movement of the robot is continued from right to left, pin 62 is cammed downwardly as it rides along the undersurface of plate portion 56b. When pin 62 is fully lowered by plate portion 56b, i.e., when pin 62 is disposed just over pin 57, plates 37 and 38 of the robot are swung sufficiently so that projecting surfaces 18e and 18f of the robot are freed from respective extensions 38a and 38b thereby to permit spring 30 to act and cause the robot to be erected. It will be apparent that when pin 62 is in its lowermost position, plate 56 will be rotated to a position wherein portion 56b thereof will be in horizontal relation. After pin 62 passes from beneath plate portion 56b, gravity acts to return plate 56 to its FIG. 9 position.

After the robot has been erected as just described, the same is then adapted for pushing engagement with the first railway car axle contacted during left to right movement of the robot. Movement of the robot is then continued from left to right thereby to cause corresponding movement of a railway car or cars. When the erected robot approaches the end of its movement from left to right, the advancing vertical surface of plate 18b of arm 18 will strike extension 49b of the catch plate. When this occurs, spring 52 permits the catch plate to deflect or rotate in a counterclockwise direction as illustrated in FIG. 11, thereby to allow passage of the erected robot. After passage of the robot, spring 52 acts to return the catch plate to its FIG. 11 position, whereupon the catch plate will be ready to cause operation of the collapsing mechanism upon return of the robot from right to left.

While the invention has been shown in but one form, it will be obvious to those skilled in the art that it is not to be so limited. On the contrary, the invention is susceptible of various forms and modifications without departing from the spirit and scope of the appended claims.

We claim:

1. In a railway car positioning apparatus including; guide track means mounted between the rails of railway track in parallel relation with the latter and a robot mounted by said guide track means for movement in either direction therealong, which robot includes; a base having rollers in rolling engagement with said guide track means, arm means including a first arm pivotally secured at one of its ends to said base for swinging movement, in a vertical plane parallel with said guide tracks, between a generally vertical erected position and a generally horizontal collapsed position, said arm means including a second arm having one end thereof pivoted to said first arm at a location spaced from said one end of the latter, an abutment on said base and arranged to be engaged by the other end of said second arm thereby to prevent swinging movement of said first arm beyond its erected position so as to adapt said first arm for pushing engagement with a railway car axle when the robot is moved in one direction and to permit said first arm to deflect under a railway car axle when the robot is moved in the other direction, resilient means connected to said arm means for urging said first arm to its erected position thereby to engage a rail car axle, and releasable means engageable with said arm means for holding both of said arms collapsed for movement of the robot in either direction beneath a rail car axle; the improvement comprising, a bar having one end thereof pivotally mounted adjacent one side of said guide track means for swinging movement, in a vertical plane parallel with the latter, between a generally horizontal position and an inclined position, means for preventing upward swinging movement of said bar beyond said inclined position and thereby limiting swinging movement of the bar through an angle less than 90°, said bar including means defining a guideway extending longitudinally of the bar, a catch pivotally mounted on said bar adjacent the other end thereof, which catch is adapted to be engaged by said second arm of the robot, when both of said arms are erected and when the robot is moved in said other direction, thereby to raise said bar to its inclined position, and means on said first arm adjacent the other end thereof, which means is received within said guideway, when said bar is in its inclined position, for collapsing said arms during continued movement of the robot in said other direction, said catch being yieldable to permit passage of said arms when said robot is moved in said one direction.

2. The improvement according to claim 1 and further defined by, said releasable means including a member extending over the other side of said guide track means, which releasable means releases said arms upon said member being depressed, and a rocking member pivotally mounted adjacent said other side of said guide track means and including a normally inclined surface arranged to receive said member thereunder for depressing the same upon movement of the robot therepast.

3. A railway car positioning apparatus comprising, in combination, guide track means mounted between the rails of a section of railway track in parallel relation with the latter, a collapsible robot mounted on said guide track means for movement in either direction therealong, said robot being adapted, when erected, for pushing engagement with a railway car axle when the robot is moved in one direction and said robot being adapted to be deflected under a railway car axle when the robot is moved in the other direction, said robot being collapsible to clear a rail car axle when the robot is moved in either direction thereunder, said robot including resilient means urging the same to its erected position and further including releasable means for holding the robot collapsed, a robot collapsing mechanism mounted adjacent said guide track means and including means engageable with said robot for collapsing the same upon its movement in said other direction, robot erecting mechanism mounted adjacent said guide track means in spaced relation with said collapsible means, which erecting mechanism is adapted for cooperation with said releasable means upon movement of said robot therepast for causing the robot to be erected, collapsing and erecting of said robot being responsive to movement of the robot past said collapsing mechanism and said erecting mechanism, respectively, and being independent of railway car movement.

4. In combination with a robot of the type mounted between rails of railway track for movement in either direction along a path parallel thereto, which robot is adapted, when erected, for pushing engagement with a rail car axle when the former is moved in one direction and which robot is adapted, when erected, to deflect under a railcar axle when the robot is moved in the other direction, said robot including a member which, when urged downwardly, causes collapsing of the robot to clear a rail car axle, said robot including resilient means urging the same to its erected position and further including releasable means for holding the robot collapsed, the improvement comprising, a robot collapsing mechanism mounted adjacent one side of the path of movement of said robot, said mechanism including a bar pivoted at one end thereof for swinging movement, in a vertical plane parallel with the path of movement of the robot, between a generally horizontal position and an inclined position, means for preventing swinging movement of said bar beyond its inclined position and thereby limiting swinging movement of the bar to an angle less than 90°, said bar including means defining a guideway extending therealong, a catch pivotally mounted on the other end of said bar and adapted to be engaged by the erected robot, when the latter is moved in said other direction, thereby to cause said bar to be swung to its inclined position, said member on the robot being received in said guideway, when the bar is in its inclined position and when the erected robot is moved in said other direction, thereby to collapse the robot upon its being moved in said other direction, said catch being yieldable to permit movement of the erected robot in said one direction.

5. In combination with a railway car positioning apparatus of the type including guide track means mounted between the rails of a section of railway track in parallel relation with the latter, a collapsible robot mounted by said guide track means for movement in either direction therealong, which robot comprises collapsible arms including one arm in inclined bracing relation when the robot is erected thereby adapting the robot for pushing engagement with a rail car axle when the former is moved in one direction and permitting the robot to deflect under a rail car axle when the robot is moved in the other direction, said robot further including a member which, when lowered along an arcuate path relative to the robot, causes collapsing of said arms thereby adapting the robot to pass freely beneath a rail car axle, said robot including resilient means urging the arms to their erected position and further including releasable means for holding said arms collapsed, and means for moving the robot in either direction along said guide track means, the improvement comprising, a robot collapsing mechanism mounted adjacent one side of said guide track means and including a bar pivotally mounted at one end thereof for movement between a generally horizontal position and an inclined position, means preventing upward swinging movement of said bar beyond its inclined position and thereby limiting swinging movement of said bar to an acute angle, said bar including means defining a guideway extending therealong, an element pivotally mounted adjacent the other end of said bar, said element being arranged to be engaged by said one arm of the robot when the same is erected and moving in said other direction thereby to cause movement of said bar to its inclined position upon continued movement of said robot in said other direction, said member being received in said guideway upon still further movement of the robot in said other direction thereby to cause said member to be lowered, relative to the robot, along said arcuate path during continued movement of the robot in said other direction, said element being yieldable to permit movement of the robot in said one direction.

6. The improvement according to claim 5 further defined by, said releasable means including an extension disposed over the other side of said guide track means, which releasable means is adapted to release said arms upon depressing of said extension, a robot erecting mechanism disposed adjacent said other side of said guide track means and including a normally inclined, rockably mounted plate arranged to receive said extension thereunder upon movement of the robot therepast thereby to depress said extension for release of said arms.

References Cited
UNITED STATES PATENTS

| 3,028,819 | 1/1958 | Brosnan | 104—176 |
| 3,194,176 | 7/1965 | Garbers | 104—176 |

ARTHUR L. LA POINT, *Primary Examiner.*

D. F. WORTH, *Assistant Examiner.*